United States Patent [19]

Bentley

[11] 4,011,893
[45] Mar. 15, 1977

[54] FLOW CONTROL VALVE

[76] Inventor: Clarence Bentley, 9256 Stamps Ave., Downey, Calif. 90240

[22] Filed: Feb. 3, 1975

[21] Appl. No.: 546,548

[52] U.S. Cl. .................................. 138/43; 138/42; 138/45; 138/46; 239/542
[51] Int. Cl.² ..................... F16D 1/00; B05B 15/00
[58] Field of Search .................... 138/37, 40–46, 138/43, 154, 118.1, 118, 45; 137/414, 517, 504, 556.6; 251/24, 61.1, 120, 126, 127, 117; 239/568, 533, 535, 101, 86, 542, 538, 540, 534

[56] References Cited

UNITED STATES PATENTS

| 1,964,300 | 6/1934 | Perry et al. | 138/43 |
| 3,807,430 | 4/1974 | Keller | 239/542 |
| 3,815,636 | 6/1974 | Menzel | 138/43 |
| 3,882,892 | 5/1975 | Menzel | 138/43 X |
| 3,954,223 | 5/1976 | Wichman et al. | 138/43 X |

*Primary Examiner*—Richard E. Aegerter
*Assistant Examiner*—John W. Sheppard
*Attorney, Agent, or Firm*—Gordon L. Peterson

[57] ABSTRACT

A flow control valve having a valve chamber which is adapted to receive fluid under pressure and which comprises a valve member having a surface with a groove therein and an outlet passage terminating at one end in a port in the groove. A resilient element is provided in the valve chamber in confronting relationship with the groove. The resilient element has an aperture in registry with the groove. The resilient element and the valve member are mounted for relative movement so as to change the relative position of the groove and the aperture, and this permits the manual selection of the flow rate. The pressure in the valve chamber urges the resilient element into the groove an amount which is dependent on the magnitude of the pressure. In this way the selected flow rate is made independent of inlet pressure fluctuations.

20 Claims, 13 Drawing Figures

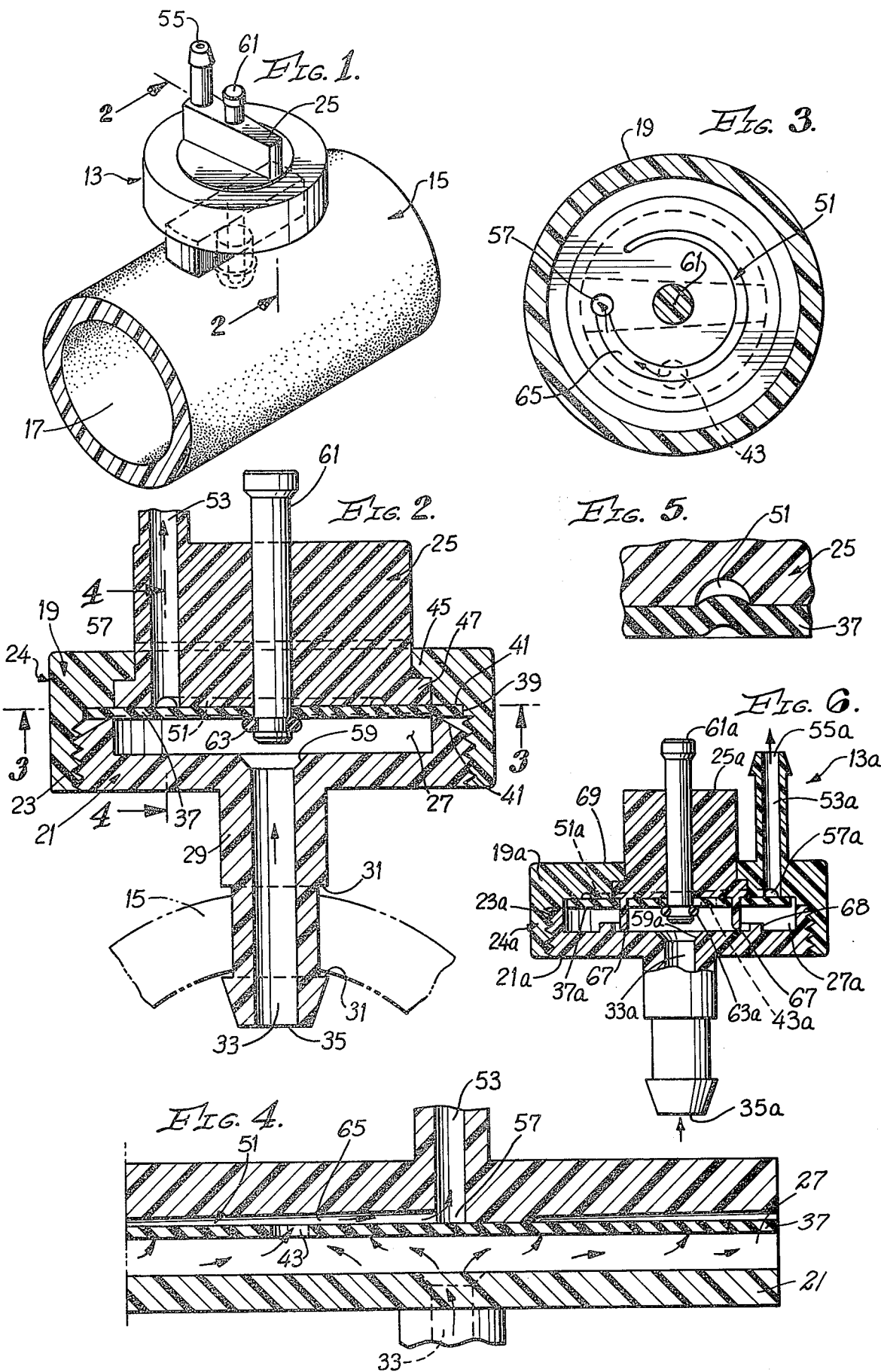

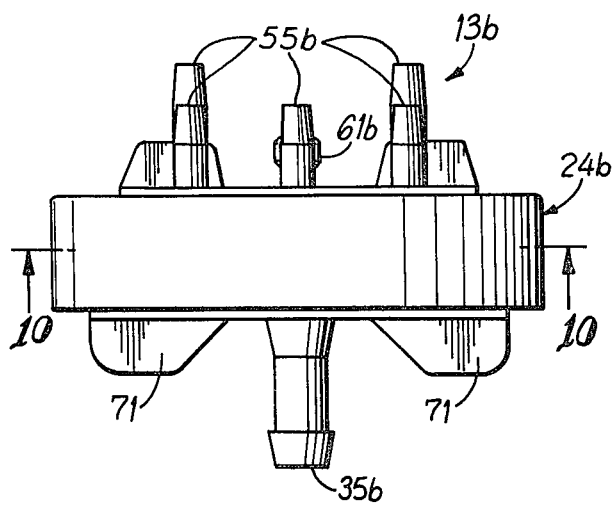
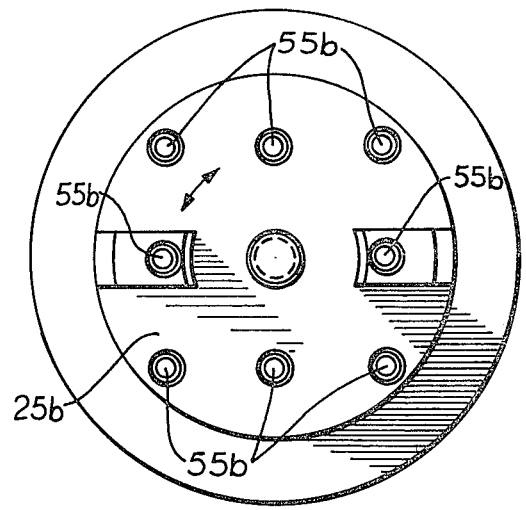
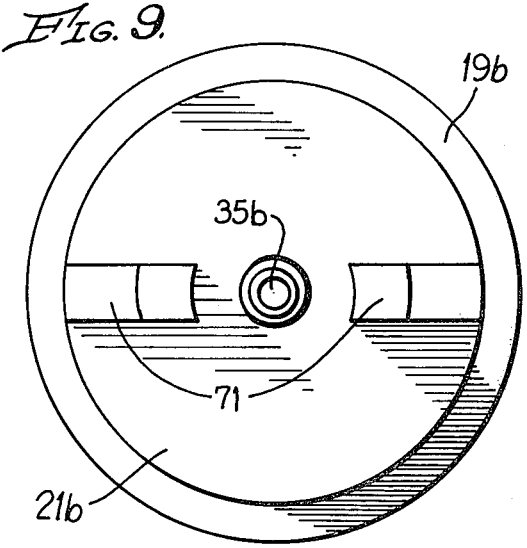
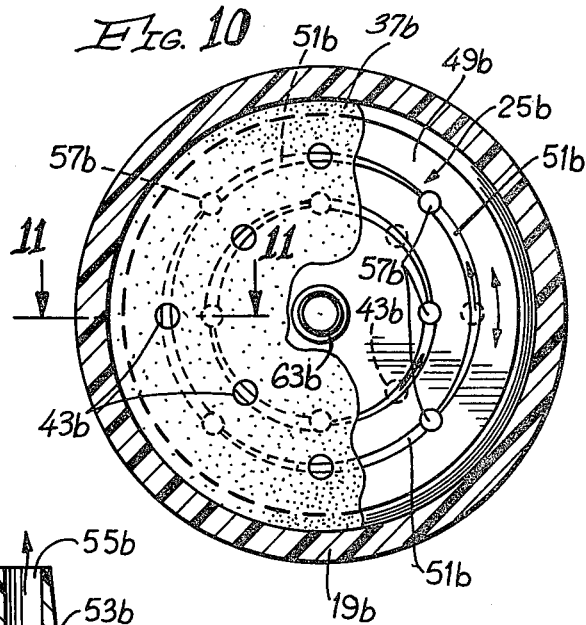
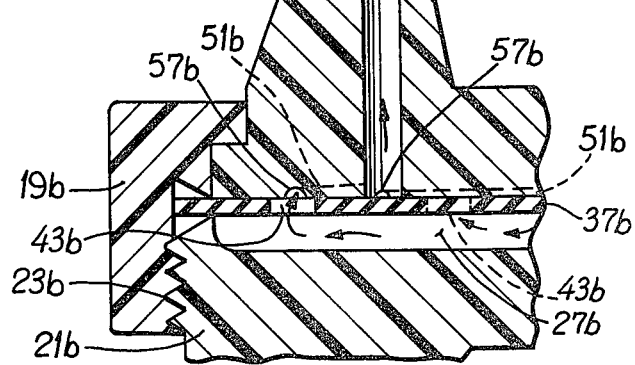

FLOW CONTROL VALVE

BACKGROUND OF THE INVENTION

Drip irrigation involves slowly metering various agriculture fluids such as water adjacent each plant which is to be grown. Normally, the metering of these fluids is carried out over a relatively long time period. Drip irrigation conserves water, minimizes weed growth, and enables various agricultural liquids such as fertilizers to be fed through the irrigation system.

With drip irrigation, it is important that the water be accurately metered. Unfortunately, water sources often provides water at fluctuating pressures, which if ignored, would significantly effect flow rate onto the plants. In addition, when fields and irrigation lines are on a slope, more pressure is available at the lower elevations than at the higher elevations.

To provide pressure control, master pressure regulators can be used, but these increase the cost of the irrigation system. Pressure compensating emitter valves, such as the valves shown in Rondas U.S. Pat. No. 3,693,888 can be used. However, the patented valve has minute passages which are subject to clogging. In addition, the patented construction has no means for manually adjusting the flow rate.

It is very important that flow rate be adjustable. For example, where drip irrigation is used in an orchard, more water must be applied as the trees grow. A conventional technique is to increase the number of emitter valves at the base of each of the trees as the trees grow. However, this unnecessarily duplicates the emitter valves and requires significant labor cost to install the additional valves.

A valve which can be used to adjust the flow rate is not novel per se as evidenced, for example, by Prosser U.S. Pat. No. 3,322,145 and Toeppen U.S. Pat. No. 3,341,168. However, neither of these patented valves is a drip irrigation valve and both are relatively complex.

SUMMARY OF THE INVENTION

The present invention provides a simple, inexpensive flow control valve suitable for drip irrigation purposes in which flow rate is adjustable, and once the flow rate is set, fluid pressure fluctuations will not alter the flow rate. To obtain this desirable result, the present invention provides a valve member having a groove in one surface and an outlet passage terminating at one end in a port in the groove. Means including the valve member define a valve chamber adapted to receive fluid under pressure. The groove opens into the valve chamber.

A resilient element is provided in the valve chamber and confronts the groove. The resilient element has an aperture at least partially in registry with the groove. Accordingly, the region of the groove and the resilient element between the port and the aperture at least partially define a flow passage.

The resilient element and the valve member are mounted for relative movement to change the relative position of the port and the aperture. This in turn varies the length of the flow passage. Suitable means provide a restriction in the flow passage which varies with the length of the flow passage.

In use of the valve, an increase in inlet pressure resiliently deforms the resilient element further into the groove to provide a first restriction to fluid flow. This restriction varies with inlet pressure. The basic relationship between inlet pressure and the amount of the restriction can be controlled by controlling the resilience of the resilient element. If desired, the restriction can be made independent of inlet pressure by using a nondeformable element in lieu of the resilient element. For drip irrigation systems, it is desirable to select the resilience of the resilient element so that the flow rate remains substantially constant, i.e. independent of inlet pressure fluctuations. Thus, the flow rate can be selected by relatively moving the aperture in the resilient element and the port to vary the length of the flow passage.

There are various ways in which the flow passage can be restricted to permit selection of the flow rate. For example, a groove containing dams or a groove which is of progressively increasing cross sectional area as the groove extends toward the port can be used. Both of these are selfcleaning. With the tapered groove any particle within the groove tends to be moved by the stream of fluid toward a wider region of the groove. With the dams, full line pressure builds up on a trapped particle to move it toward the outlet. Also at low inlet pressures the cross sectional area of the flow passage increases to permit escape of any particulate matter. Finally, by appropriately relatively moving the groove and the resilient element, any particles in the groove can be rolled toward the largeend of the groove.

Other advantages of the invention are its low cost and simplicity. For example, the means which defines the valve chamber may include a valve body and control means or a control member mounted on the valve body. The control member is movable to change the relative position of the port and aperture to thereby vary the length of the flow passage.

The member of the valve on which the groove is formed may be either the valve body or the control member. When the groove is formed on the control member, the groove moves with the control member and the resilient element is preferably held stationary relative to the valve body. To accomplish this the valve body can be conveniently formed by first and second valve body sections with a peripheral region of the resilient element being clamped between portions of the valve body sections. This clamping action on the resilient element holds the resilient element in position relative to the valve body so that movement of the control member moves the groove relative to the aperture in the resilient element. Secondly, the peripheral region of the resilient element forms a seal between the valve body sections and between the control member and the valve body. Finally, with the resilient element clamped to the valve body, the resilient element is usable to assist in mounting the control member.

Alternatively, the groove may be formed in the valve body and the resilient element can be drivingly connected to the control member. In this event, the movement of the control member moves the aperture in the resilient element and the groove is stationary with respect to the valve body.

One advantage of this latter construction is that the driving relationship between the control member and the resilient element accurately orients the aperture in the resilient element relative to the port. This enables graduations to be placed on the valve body indicating the flow rates which will occur at various positions of the control member. Flow rate graduations can be used because the valve can be made insensitive to inlet pressure fluctuations.

A second advantage of this construction is that the outlet can be provided on the valve body in which event the outlet will not rotate or otherwise move with the control member. This facilitates the attachment of the outlet to a hose or tube.

It is important that the groove register with the aperture as the aperture and groove are moved relative to each other. This can be simply and easily accomplished by mounting the control member for rotational movement and making the groove of circular or part circular configuration in plan.

One problem with relatively high inlet pressure is that the resilient element is forced tightly against the control member or the valve body depending upon the particular construction employed. In either event, the frictional forces resisting movement of the control member increase under high inlet pressure. These frictional forces make it difficult or impossible to move the control member to change the flow rate. To solve this problem the present invention provides means for reducing the fluid pressure in the valve chamber between the inlet and the resilient element to thereby facilitate movement of the control member relative to the valve body. Such means can advantageously include a valve comprising a valve seat and a valve element slidably mounted on the control member for movement into and out of engagement with the valve seat.

Another feature of the invention is that the valve can have multiple outlets, the flow rate through each of which may be made independent of inlet pressure. In addition, the flow rate though each of the outlets may be made selectively variable. This can be accomplished, for example, by providing multiple grooves and a separate aperture through the resilient element for each of the grooves. Movement of the control member simultaneously relatively moves the apertures and the associated grooves so that flow rate selection is obtained.

Another advantage of the multiple outlet construction is that selected ones of the outlets can be blocked off internally by providing a new resilient element having fewer apertures therein than there are grooves. In this event, the resilient element serves to internally block off selected outlets. This is preferable to external capping of the outlets because internally blocked outlets are not subject to being inadvertently opened. Of course, the valve must be capable of being at least partially dissambled to allow the replacement of the resilient element.

BRIEF DESCRIPTION OF THE DRAWINGS

FIG. 1 is an isometric view of a flow control valve installed on a hose.

FIG. 2 is an enlarged sectional view taken generally along line 2—2 of FIG. 1.

FIG. 3 is a sectional view on a reduced scale taken generally along line 3—3 of FIG. 2.

FIG. 4 is an enlarged fragmentary sectional view taken generally along line 4—4 of FIG. 2.

FIG. 5 is a fragmentary sectional view on an enlarged scale illustrating how the resilient member can be forced into the groove to reduce the cross sectional area of the groove.

FIG. 6 is a sectional view similar to FIG. 2 of a second form of flow control valve constructed in accordance with the teachings of this invention.

FIG. 7 is a side elevational view of a flow control valve of this invention having multiple outlets.

FIG. 8 is a top plan view of the flow control valve of FIG. 7.

FIg. 9 is a bottom plan view of the flow control valve of FIG. 7.

FIG. 10 is a sectional view taken generally along line 10—10 of FIG. 7 with portions of the resilient element broken away.

FIG. 11 is an enlarged fragmentary sectional view taken generally along line 11—11 of FIG. 10.

DESCRIPTION OF THE PREFERRED EMBODIMENTS

Figure 12:
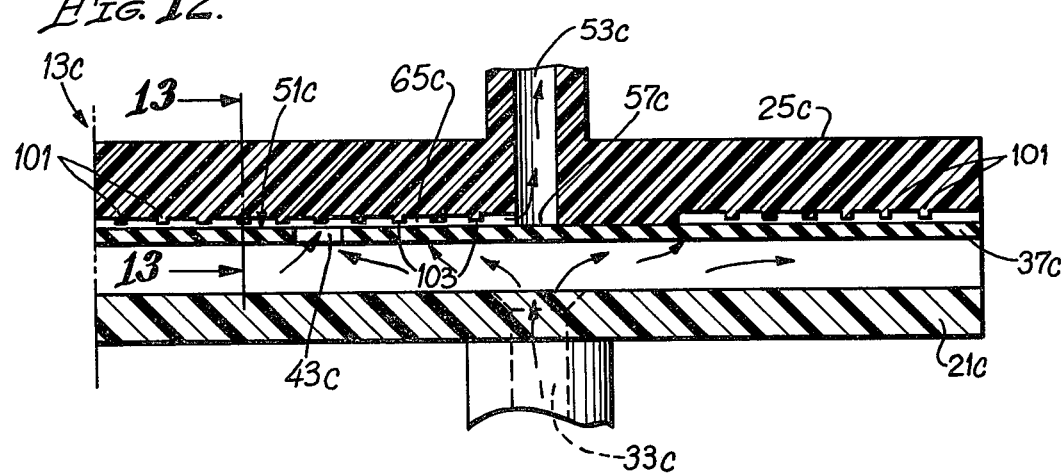
FIG. 12 is a fragmentary sectional view similar to FIG. 4 illustrating a flow control valve having a flow passage which is restricted by dams.

FIGS. 1 and 2 show a flow control valve 13 mounted on a conduit 15 which may be a hose of the type commonly used in drip irrigation systems. The conduit 15 has a central passage 17 through which water under pressure can be supplied to the flow control valve 13.

The flow control valve 13 is particularly adapted for use in a drip irrigation system. However, the flow control valve 13 may be used in other fluid systems where it is necessary to adjust the flow rate through the valve and/or make the flow rate independent of, or less dependent upon, fluctuations in inlet pressure.

As shown in FIG. 2, the flow control valve 13 includes valve body sections 19 and 21 which are interconnected by screw threads 23 to form a valve body 24 and control means in the form of a valve member, or a control member 25. The valve body sections 19 and 21 and the control member 25 form valve members of the flow control valve 13, and they cooperate to define a valve chamber 27.

The valve body section 21 has a mounting stem 29 which is adapted to project through an opening in the wall of the conduit 15 as shown in FIG. 2. The stem 29 has annular shoulders 31 for retaining the flow control valve 13 in position on the conduit 15. The flow control valve 13 can be mounted in various different ways, and the manner illustrated in FIG. 2 is purely illustrative.

The valve body section 21 has an inlet passage 33 which terminates at one end in an inlet 35 and at the other end in the valve chamber 27. A resilient element which, in the embodiment illustrated, is in the form of a relatively thin, resiliently flexible diaphragm 37 is provided within the valve chamber 27. In the form illustrated in FIGS. 1–5, an annular peripheral region 39 of the diaphragm 37 is clamped between opposed shoulders or clamping portions 41 of the valve body sections 19 and 21, respectively. Thus, the diaphragm 37 forms a fluid seal between the valve body sections 19 and 21 and between the valve body section 19 and the control member 25.

The diaphragm 37 has a aperture 43 (FIGS. 3 and 4). Except for the aperture 43 the diaphragm forms a fluid impervious wall across the valve chamber 27. The diaphragm 37 is constructed of a material which is flexible, resilient, and impervious to, and not corroded by, the fluid passing through the flow control valve 13. For example, the diaphragm 37 may be constructed of rubber.

In the embodiment illustrated, the control member 25 is rotatably mounted on the valve body 24. This is accomplished by cooperating annular flanges 45 and 47 on the valve body section 19 and the control member, respectively.

The control member 25 has an interior surface 49 which defines one wall of the valve chamber 27 and which engages the diaphragm 37. A second function of the diaphragm 37 is to assist in the rotational mounting of the control member 25 by limiting the extent to which the control member can advance into the valve chamber 27.

A groove 51 is formed in the interior surface 49. The groove 51 opens toward the valve chamber 27 and is completely covered by the diaphragm 37 except for the aperture 43. Although the groove 51 could be of various configurations, in the embodiment illustrated it is annular as shown in FIG. 3. It is necessary that the aperture 43 communicate with the groove 51 as the latter is moved by rotation of the control member 25. Accordingly, the arcuate configuration of the groove 51 is established by the radial spacing between the aperture 43 and the axis of rotation of the control member 25.

The control member 25 has an outlet passage 53 which terminates at its outer end in an outlet 55 and at its inner end in a port 57 within the groove 51. The groove 51 preferably contains means for providing a restriction to fluid flow which can be varied to permit selection of a flow rate. In the embodiment illustrated, this restriction takes the form of the groove 51 having a progressively increasing cross sectional area as it extends toward the port 57. In addition to or in lieu of the tapered groove 51, the restriction may include stepped portions of the groove, dams within the groove, orifices within the groove, etc. In the embodiment shown in FIGS. 1–5, the groove 51 is of arcuate cross section and of progressively increasing width and depth as it extends toward the port 57.

To permit a pressure reduction in the valve chamber 27 and thereby facilitate angular movement of the control member 25, the flow control valve 13 includes a valve for blocking off flow into the valve chamber. This valve includes a valve seat 59 (FIG.. 2) formed at the inner end of the inlet passage 33, a valve element 61 mounted on the control member 25 for axial sliding movement relative thereto, and a seal 63 carried by the valve element 61 and engageable with the valve seat 59. Forcible engagement of the seal 63 against the valve seat 59 completely blocks off flow from the inlet 35 into the valve chamber 27. However, in order to obtain the desired pressure drop in the valve chamber 27, some fluid leakage into the valve chamber would be permissible. The outer end of the valve element 61 projects beyond the control member 25 to permit manual operation of the valve element.

In use, the flow control valve 13 may be mounted on the conduit 15 as shown by way of example in FIG. 2. Water or other fluid can then flow from the conduit 15 through the inlet 35, the inlet passage 33, the valve chamber 27, the aperture 43, the groove 51, the port 57, the outlet passage 53, and the outlet 55. The water may drip out of the outlet 55 or the outlet 55 may in turn be coupled to another condiuit (not shown) which carries the water to the desired location.

In many conventional valves, an increase in the water pressure at the valve inlet causes an increased flow rate through the valve. However, with the flow control valve 13, the effect of the increased inlet water pressure on flow rate can be controlled. This is accomplished by the cooperation between the resilient diaphragm 37 and the groove 51. Specifically, as the inlet pressure increases, the pressure in the valve chamber 27 correspondingly increases and the pressure drop across the aperture 43 and the groove 51 increases. The increased pressure differential across the diaphragm 37 resilient deforms the diaphragm 37 into the groove 51 to restrict flow through the groove as illustrated by way of example in FIG. 5. The amount of the restriction of the groove 51 increases as the water pressure in the valve chamber 27 between the diaphragm and the seat 59 increases, and conversely the restriction decreases with a decrease in such pressure. The resilience of the diaphragm 37 can be selected to obtain the desired relationship between the amount of the restriction of the groove 51 and presssure in the valve chamber 27. For drip irrigation systems, it is preferred to increase the restriction to flow in the groove 51 with increases in pressure in the valve chamber 27 so that the flow rate through the flow control valve 13 will be substantially immune to pressure changes in the valve chamber.

As shown in FIG. 3, the large end of the groove 51 intersects the port 57 and the small end of the groove does not. However, this configuration of the groove 51 is essential and the narrower end of the groove could intersect the port 57, if desired. However, by spacing the narrow end of the groove 51 an amount at least equal to the diameter of the aperture 43, a shut off position is provided in which there is no flow through the valve 13. Flow through the groove 51 from the aperture 43 to the port 57 is substantially entirely unidirectional. Thus, with the port 57 and the aperture 43 in their relative positions shown in FIG. 3, flow would take place from the aperture 43 to the port 57 in the groove 51 only in the direction of the arrows, i.e. toward the relatively large cross sectional area end of the groove 51. Thus, the region of the groove 51 and the diaphragm 37 between the aperture 43 and the wide end of the groove 51 define a fluid passage 65 (FIGS. 3 and 4.).

Rotation of the control member 25 moves the port 57 and the groove 51 relative to the aperture 43 and the valve body 24. With the port 57 and the aperture 43 aligned, a full open or flushing position is provided. With the aperture 43 out of communication with the groove 51, a shut off position is provided. Rotation of the control member 25 intermediate these positions changes the length of the fluid passage 65, and this in turn changes the resistance to fluid flow in the fluid passage 65. Specifically, the longer the fluid passage 65, the greater the resistance to fluid flow and hence the lower the flow rate. Conversely, by shortening the fluid passage 65, the flow rate can be increased. Thus, by manually moving the control member 25 a control rate can be selected. The selected flow rate is then automatically maintained independent of fluid pressure variations in the valve chamber 27 by cooperation between the diaphragm 37 and the groove 51 as explained hereinabove with relation to FIG. 5.

When fluid pressure in the chamber 27 is relatively high, the diaphragm 37 is urged very tightly against the interior surface 49 of the control member 25. The restrains or prevents rotation of the control member 25. If it is desired to rotate the control member 25 to change the flow rate when relatively high pressure fluid is in the valve chamber 27, the valve element 61 is urged axially inwardly to urge the seal 63 against the valve seat 59 to block off additional fluid from entering the valve chamber. This provides a pressure reduction in the valve chamber 27 which enables the operator to easily turn the control member 25 to select a new flow rate. When the operator releases the valve element 61, the pressure of the water acting against the valve element urges it to the open position illustrated in FIG. 2.

The flow control valve 13 is not limited to use with water as it will operate satisfactorily with many different liquids including fertilizers and various agricalatural chemicals.

The flow control valve 13 is of very simple and inexpensive construction. The valve body sections 19 and 21, the control member 25, and the valve element 61 can all be constructed of molded plastic material.

The flow control valve 13 is also very easy to assemble. For example, the control member 25 and the valve body section 19 can be slid together and the valve element 61 inserted through the control member and the diaphragm 37. The seal 63 is then installed on the inner end of the valve element 61 to prevent removal of the valve element. The valve body sections 19 and 21 are then interconnected using the threads 23.

FIG. 6 shows a flow control valve 13a which is identical to the flow control valve 13 (FIGS. 1–5) in all respects not specifically shown or described herein. Portions of the flow control valve 13a corresponding to portions of the flow control valve 13 are designated by corresponding reference numerals followed by the letter a.

One difference between the flow control valves 13 and 13a is that the diaphragm 37a of the latter is mounted on, and drivingly connected to, the control member 25a by a plurality of pins 67 formed integrally with the flow control member. In addition the peripheral region of the diaphragm 37a is not clamped between the valve body sections 19a and 21a. Accordingly, the resilient element 37a and the aperture 43a thereof can be moved relative to the port 57a by turning the control member 25a. A boss 68 on the body section 21a prevents the resilient element 37a from falling off the pins 67.

Another difference between the flow of control valves 13 and 13a is that the groove 51a and the outlet passage 53a are formed on the valve body section 19a. Accordingly, turning of the control member 25 moves the apertures 43a of the diaphragm 37a relative to the port 57a and the valve body 24a.

Finally, the valve body section 19a projects radially inwardly a greater distance than the valve body section 19 to provide adequate room to permit the groove 51a to be formed thereon. Similarly, the radial dimensions of the control member 25a are correspondingly reduced. With the flow control valve 13a, some alternate means of sealing the threads 23a may be used, if desired. The operation of the valve 13a is identical to the operation of the valve 13 except that with the former the groove 51a is stationary relative to the valve body and the aperture 43a moves relative to the valve body to select a flow rate.

One advantage of the valve 13a is that the pins 67 accurately index or orient the aperture 43a relative to the control member 25a. Similarly, the position of the port 57a relative to the valve body section 19a is known because the latter is formed in the valve body section 19a. This permits the upper surface 69 of the valve body section 19a to be marked with graduations which are indicative of flow rates. In other words, the control member 25a can be set for a given flow rate indicated by the graduations inasmuch as flow rate is independent of pressure variations in the valve chamber 27a.

A second advantage of the control valve 13a is that the outlet 55a is fixed with respect to the valve body 24a. In other words, rotation of the control member 25a does not move the outlet 55a relative to the valve body 24a. Accordingly, any hoses or flexible conduits attached to the outlet 55a are not twisted or otherwise moved as a result of making a flow rate selection by turning the control members 25a.

FIGS. 7–11 show a flow control valve 13b which is identical to the flow control valve 13 in all ways not specifically shown or described herein. Portions of the flow control valve 13b corresponding to portions of the flow control valve 13 are designated by corresponding reference numerals followed by the letter b.

The primary difference between the flow control valves 13 and 13b is that the latter has multiple outlets 55b, the flow rate through each of which can be simultaneously controlled by turning the control member 25b. For example, each of the outlets 55b may be coupled to separate conduits (not shown) to thereby provide a separate water outlet. Although eight of the outlets 55b are shown in FIG. 8, this is merely illustrative as any number of the outlets 55b may be provided.

In order that each of the outlets 55b may serve as an outlet for water, it is necessary that each of them be in communication with the valve chamber 27b. To provide this commmmunication, a separate outlet passage 53b and a separate port 57b is provided for each of the outlets 55b. Although it may be possible under appropriate circumstances for multiple outlets 55b to share the same groove 51b, in the embodiment illustrated, one groove 51b is provided in the interior surface 49b of the control member 25b for each of the outlets 55b. Each of the grooves 51b extends between a pair of adjacent ports 57b and is of progressively increasing cross sectional area as it extends from one of the ports 57b to an adjacent port 57b. Each of the ports 57b as one relatively large cross sectional area end of a groove 51b and one relatively small cross sectional area end of a groove entering it. Although various configurations and arrangements of the grooves 51b are possible, in the embodiment illustrated, the grooves 51b are arranged in two concentric circles with each of the grooves extending through an arc forming a part of a circle.

Additionally, the diaphragm 37b has one aperture 43b in registry with each of the grooves 51b. In other words, one of the apertures 43b is provided for each of the outlets 55b, although under certain circumstances, multiple outlets could share one of the apertures 43b. Thus, each of the outlets 55b is in communication with the chamber 27b through the associated outlet passage 53b, the associated port 57b, the associated groove 51b, and the associated aperture 43b.

The flow control valve 13b differs somewhat structurally and dimensionally from the flow control valve 13 as can be ascertained by a comparison of FIGS. 1–5 with FIGS. 7–11. For example, the valve body section 21b has projecting tabs 71 (FIGS. 7 and 9) to facilitate screwing the valve body sections 19b and 21b together. In addition, the radial dimensions of the flow control valve 13b are enlarged with respect to the flow control valve 13 in order to provide adequate room for the multiple outlets 55b.

The operation of the flow control valve 13b is identical to the operation of the flow control valve 13 except that with the former fluid flow through each of the outlets 55b is obtained. Flow rate selection through each of the outlets 55b is obtained by turning the control member 25b relatively to the valve body 24b. Although other arrangements are possible, in the embodiment illustrated in FIGs. 7–11, flow rates through each of the outlets 55b are substantially identical for any selected angular position of the control member 25b. The diaphragm 37b cooperates with the grooves 51b as described hereinabove with reference to FIG. 5 to make the flow rates for all of the outlets 55b substantially independent of pressure fluctuations in the valve chamber 27b.

Another advantageous characteristic of the flow control valve 13b is that one or more of the outlets 55b may be selectively blocked off internally. For example, by removing the valve body section 21b, the diaphragm 37b may be replaced with a diaphragm having no aperture 43b for the groove or grooves 51b which are to be blocked off. Accordingly, the outlets 55b corresponding to the grooves 51b having no apertures 43b are internally blocked off.

If desired, the narrow end of each of the grooves 51b could terminate short of one of the ports 57b to provide a shut off position. However, in the embodiment of FIGS. 7–11 no such shut off position is provided in order to maximize the length of each of the grooves 51b.

Figure 13:
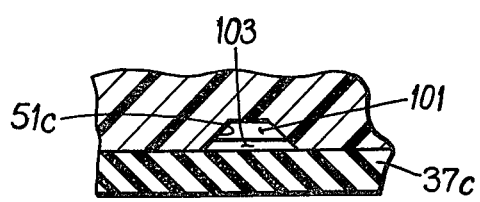
FIG. 13 is an enlarged framentary sectional view taken generally along line 13—13 of FIG. 12.

FIGS. 12 and 13 show a flow control valve 13c which may be identical to any of the flow control valves shown in FIG. 1–11 except for the groove 51c and the manner in which a restriction is formed in the groove 51c. Portions of the flow control valve 13c corresponding to portions of the flow control valve 13 (FIGS. 1–5) are designated by corresponding reference numerals followed by the letter c. For purposes of illustration, it is assumed that the flow control valve 13c is identical to the flow control valve 13 except for the features shown or described herein.

With the flow control valve 13c, the groove 51c is of constant cross sectional area throughout its full length. Although the groove 51c can be of various cross sectional configurations, it is trough or trapezoidal in cross section in the embodiment of FIGS. 12 and 13. A variable restriction is provided in the groove 51c by a series of baffles or dams 101. As best shown in FIG. 13, each of the dams 101 extends continuously from the inner end of the groove 51c toward the region where the groove is covered by the resilient element 37c. Thus, each of the dams 101 cooperates with the resilient element 37c to define an orifice 103 of reduced cross sectional area. The cross sectional area of each of the orifices 103 for a given pressure in the valve chamber 27c is controlled by the dimensions of the associated dam 101. Similarly, the number of the orifices 103 depends upon the number of the dams 101 which are provided. The size and number of the orifices can be selected depending upon the results desired. In the embodiment illustrated, the dams 101 are equally spaced; however, this is not essential.

In use of the flow control valve 13c, rotation of the control member 25 moves the groove 51c with respect to the aperture 43c to change the length of the flow passage 65c. By increasing the length of the flow passage 65c, a larger number of the restriced orifices 103 are placed in the flow passage. Accordingly, a reduction in flow volume through the valve 13c is obtained. Conversely, by shortening the flow passage 65c, one or more of the orifices 103 are removed from the flow passage and flow volume through the valve 13c increases.

Although exemplary embodiments of the invention have been shown and described, many changes, modifications, and substitutions may be made by those having ordinary skill in the art without necessarily departing from the spirit and scope of this invention.

I claim:

1. A flow control valve adapted for use with a fluid which is subject to pressure variations, said valve comprising:

wall means for defining a valve chamber, said wall means having an interior surface defining a wall of said valve chamber, a first portion of said wall of said valve chamber having means defining a groove therein facing into said valve chamber;

inlet passage means extending from said valve chamber and defining an inlet to said valve chamber;

outlet passage means leading from said groove and terminating in an outlet and defining a port at said groove;

a resilient element having means defining on aperture therein;

means for retaining the resilient element in said valve chamber in generally confronting relationship to said groove and with the aperture being communicable with the groove whereby a flow path from the inlet to the outlet is established through said valve chamber, said aperture, and said groove;

the resilient element being resiliently to permit the pressure of the fluid in said valve chamber to resiliently deflect the resilient element into said groove an amount which increases with increasing fluid pressure in said valve chamber to thereby provide a pressure dependent restriction to fluid flow through said groove; and said wall means including control means for moving at least one of the said resilient element and said first portion of said wall to vary the length of the groove through which the fluid flows in moving from the aperture to the outlet whereby the fluid flow rate through the groove can be adjusted.

2. A valve as defined in claim 1 including a plurality of dams in said groove.

3. A valve as defined in claim 1 wherein said wall means includes a valve body and said control means includes a control member mounted on said valve body for angular movement relative to said valve body, said groove being arcuate, one of said groove and said resilient element being drivingly coupled to said control member for angular movement therewith.

4. A valve as defined in claim 1 wherein a section of said groove is of progressively increasing cross sectional area as it extends toward said port.

5. A valve as defined in claim 1 wherein said wall means includes a valve body and said control means includes a control member mounted on said valve body for movement relative to said valve body, said resilient element being engageable with said valve body and said control member at least when the fluid in said valve chamber between said inlet and said resilient element is under relatively high fluid pressure with such engagement resisting movement of the control member relative to the valve body, and means for reducing the fluid pressure in the valve chamber between said inlet and said resilient element to facilitate movement of said control member relative to said valve body.

6. A valve as defined in claim 5 wherein said last mentioned means includes means defining a valve seat and a valve element mounted on said control member for movement into and out of engagement with said valve seat.

7. A valve as defined in claim 6 wherein said groove is arcuate, said control member is mounted on said valve body for angular movement relative to said valve body, and said resilient element includes a resilient diaphragm overlying said groove.

8. A valve as defined in claim 1 wherein said control means includes a control member mounted for angular movement, said control member having said interior surface thereon, said groove being formed in said interior surface of said control member.

9. A valve as defined in claim 1 wherein said wall means includes first and second valve body sections, said retaining means for said resilient element including clamping portions of said first and second valve body sections, a peripheral portion of said resilient element being clamped between said first and second valve body sections.

10. A valve as defined in claim 9 wherein said control means includes member mounted for angular movement, said control member having said interior surface thereon, said groove being formed in said interior surface of said control member, said outlet passage means being formed at least partially within said control member, said groove being arcuate in plan and said groove having a region or progressively increasing cross sectional area as the groove extends toward said port.

11. A valve as defined in claim 1 wherein said control means includes a control member mounted for angular movement, said retaining means for said resilient element drivingly couples the resilient element to said control member for angular movement with said control member whereby said aperture can be moved with respect to said groove.

12. A valve as defined in claim 11 wherein said wall means includes first and second interconnectible valve body sections, said control member being mounted on said first body section for rotational movement relative thereto, said first valve body section having said interior surface, said groove being in said interior surface of said first valve body section, and at least a portion of said outlet passage means being in said valve body section.

13. A valve as defined in claim 1 wherein said wall of said valve chamber has a second groove therein, second outlet passage means leading from said second groove and terminating in a second outlet, said resilient element having a second aperture therein, said resilient element being in generally confronting relationship to said second groove so that a flow path from the inlet to the second outlet is established through said valve chamber, said second aperture, and said second groove, the resilient element being resilient to permit the pressure of the fluid in the valve chamber to resiliently deflect the resilient element into said second groove an amount which increases with increasing fluid pressure in said valve chamber to thereby provide a pressure dependent restriction to flow through said second groove, flow restriction means in said second groove for providing another restriction to fluid flow through said second groove, said control means being capable of relatively moving the second aperture in the resilient element and said second groove while maintaining communication between the second aperture and the second groove whereby the flow rate through the valve to each of said outlets can be adjusted.

14. A valve as defined in claim 13 wherein said valve can be at least partially disassembled to permit replacement of said resilient element with a new resilient element having a different number of said apertures therein whereby flow through at least one of said outlets can be prevented.

15. A valve as defined in claim 1 wherein the aperture and the groove are relatively movable to a shut off position in which there is no communication between the port and the aperture through said groove.

16. A flow control valve for use with fluid under pressure comprising:
means for defining a valve chamber, said means including an inlet for the valve chamber whereby the fluid under pressure can be admitted to the valve chamber;
said means including a valve member and a valve body;
mounting means for mounting the valve member for angular movement relative to the valve body;
a resilient element having first and second sides;
means for retaining the resilient element in said valve chamber adjacent the valve member with said first side confronting the valve member and said second side exposed to the fluid under pressure in said valve chamber;
said valve member having a wall defining a portion of the interior surface of the valve chamber;
means on said resilient element and a portion of said wall cooperating to define a fluid passage between the wall and the resilient member;
passage means for providing communications between the valve chamber and the fluid passage whereby fluid can flow from the valve chamber to the fluid passage.
means responsive to the relative angular position of the valve member of the passage means for varying the restriction to the fluid flow through the fluid passage whereby the flow rate through the fluid passage can be adjusted;
means for defining an outlet communicable with the fluid passage; and
said valve body including first and second body sections, said retaining means including clamping portions of said body sections which clamp a peripheral region of the resilient element to the valve body and said mounting means includes said resilient element and cooperating flanges on said valve body and said valve member.

17. A flow control valve as defined in claim 16 wherein said passage means includes at least one aperture in said resilient element.

18. A flow control valve as defined in claim 16 including means defining a plurality of orifices in said fluid passage.

19. A flow control valve adapted for use with a fluid which is subject to pressure variations, said valve comprising:
wall means for defining a valve chamber, said wall means having an interior surface defining a wall of said valve chamber;
inlet passage means extending from said valve chamber and defining an inlet to said valve chamber whereby the fluid can be supplied to the valve chamber;

a resilient element having means defining an aperture therein;

means for retaining the resilient element in said valve chamber in generally confronting relationship to said wall of the valve chamber and with resilient element exposed to the fluid under pressure in said valve chamber;

means on said wall of said valve chamber and said resilient element for defining a fluid passage between said wall and said resilient element, said aperture being communicable with the fluid passage;

outlet passage means leading from said fluid passage and terminating in an outlet whereby a flow path through the valve is established from the inlet through the valve chamber, the aperture, and the fluid passage to the outlet; and said wall means including control means for moving at least one of the said resilient element and said wall to vary the length of the fluid passage through which the fluid flows in moving from the aperture to the outlet whereby the fluid flow rate through the fluid passage can be adjusted.

20. A flow control valve as defined in claim 19 including a plurality of dams in said fluid passage.

* * * * *